US010628473B1

(12) United States Patent
Mancini et al.

(10) Patent No.: US 10,628,473 B1
(45) Date of Patent: Apr. 21, 2020

(54) SYSTEMS AND METHODS FOR PROVIDING RELEVANT CONTENT ON TRENDING TOPICS

(71) Applicant: Facebook, Inc., Menlo Park, CA (US)

(72) Inventors: Leo Litterello Mancini, San Francisco, CA (US); Allison Elaine Ball, Austin, TX (US); Andrew Yaoshu Song, San Francisco, CA (US); Christopher Charles Struhar, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 397 days.

(21) Appl. No.: 14/566,656

(22) Filed: Dec. 10, 2014

(51) Int. Cl.
*G06F 16/00* (2019.01)
*G06F 16/338* (2019.01)
*G06F 16/33* (2019.01)

(52) U.S. Cl.
CPC ........ *G06F 16/338* (2019.01); *G06F 16/3334* (2019.01)

(58) Field of Classification Search
CPC ................................................ G06F 17/30867
See application file for complete search history.

(56) References Cited

U.S. PATENT DOCUMENTS

| 2013/0198204 A1* | 8/2013 | Williams | G06F 16/27 707/748 |
| 2013/0339332 A1* | 12/2013 | Ogram | G06F 16/9535 707/705 |
| 2014/0040387 A1* | 2/2014 | Spivack | G06F 16/24578 709/206 |
| 2015/0356571 A1* | 12/2015 | Chang | G06Q 30/0201 705/7.29 |

* cited by examiner

*Primary Examiner* — Etienne P Leroux
*Assistant Examiner* — Farhad Agharahimi
(74) *Attorney, Agent, or Firm* — Sheppard Mullin Richter & Hampton LLP

(57) ABSTRACT

Systems, methods, and non-transitory computer readable media configured to determine content postings associated with authorities relating to a trending topic. Content postings associated with eyewitnesses regarding events relating to the trending topic are determined. Media content items of content postings associated with the eyewitnesses are determined. Metadata associated with content items relating to the trending topic are determined. A user interface for presenting the content postings associated with authorities, the content postings associated with eyewitnesses, the media content items, and the metadata is generated.

19 Claims, 15 Drawing Sheets

SYSTEMS AND METHODS FOR PROVIDING RELEVANT CONTENT ON TRENDING TOPICS

FIELD OF THE INVENTION

The present technology relates to the field of content provision. More particularly, the present technology relates to techniques for identifying relevant content for trending topics.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, the publication of content items can reflect many shortcomings of a social network. For example, when the social network has a large number of users, a large number of postings may be generated. In view of their number, postings can be difficult to organize and publish in a manner that optimizes their audience. In some instances, a posting may be published in a way that does not allow certain users of the social network who would find the posting most interesting to locate the posting. In other instances, a posting that is not relevant to certain users of the social network can be nonetheless presented to those users. In yet other instances, many postings may be published with one another with no apparent unifying theme or discernible relevance to their audience.

SUMMARY

Various embodiments of the present disclosure can include systems, methods, and non-transitory computer readable media configured to determine content postings associated with authorities relating to a trending topic. Content postings associated with eyewitnesses regarding events relating to the trending topic are determined. Media content items of content postings associated with the eyewitnesses are determined. Metadata associated with content items relating to the trending topic are determined. A user interface for presenting the content postings associated with authorities, the content postings associated with eyewitnesses, the media content items, and the metadata is generated.

In an embodiment, the content postings include at least one of text posts, image posts, video posts, and audio posts.

In an embodiment, the authorities include at least one of subject matter reflected in the trending topic, experts associated with the trending topic, entities identified by manual curation, and journalists from known news organizations.

In an embodiment, the content postings associated with eyewitnesses are generated and presented in real time or near real time.

In an embodiment, the determining content postings associated with eyewitnesses further comprises analyzing a plurality of signals associated with each content posting. Each signal of the plurality of signals is weighted based on its relative importance in identifying a eyewitness.

In an embodiment, the determining content postings associated with eyewitnesses further comprises combining the weighted signals to generate an aggregate value for the content posting.

In an embodiment, the determining content postings associated with eyewitnesses further comprises determining whether the aggregate value for the content posting satisfies a threshold value indicating that the content posting is from an eyewitness.

In an embodiment, the determining media content items of content postings associated with the eyewitnesses further comprises analyzing a plurality of signals associated with each media content item.

In an embodiment, the metadata includes at least one of a number of the content postings, time of the content postings, demographic data regarding entities that uploaded the content postings, time of peaks in the number of the content postings.

In an embodiment, a timeline of events relating to the trending topic is generated based on peaks in a distribution of timestamps of the content postings and comments parsed from content postings contemporaneous with the peaks.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
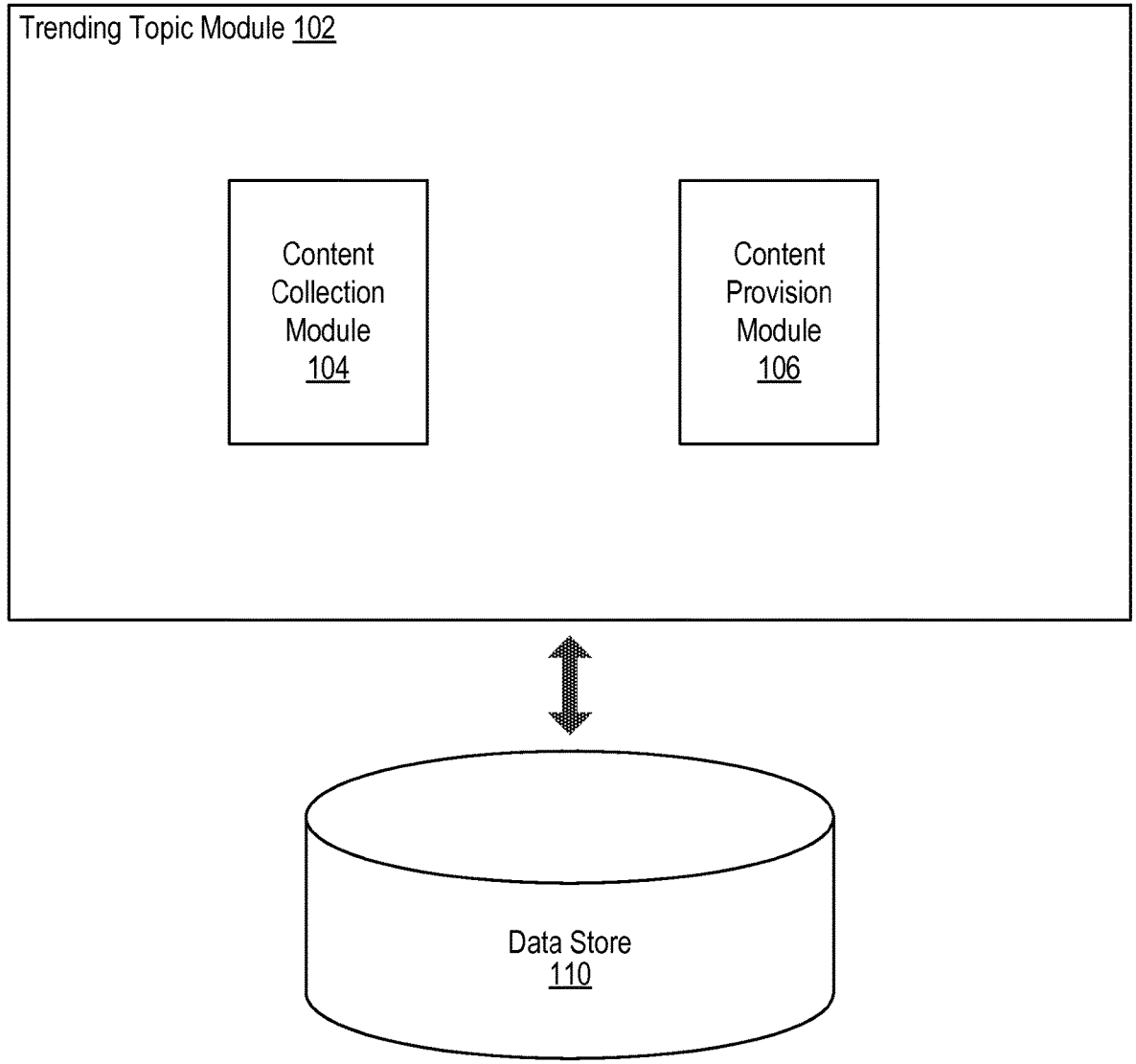
FIG. 1 illustrates an example system including an example trending topic module configured to share content postings with a user of a social networking system, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Organizing Content Postings Based on Trending Topics

People use computing devices (or systems) for a wide variety of purposes. Computing devices can provide different kinds of functionality. Users can utilize their computing devices to produce information, access information, and share information. In some cases, users can use their computing devices to generate and publish content postings. Content postings can include any combination of content types, such as text, images, videos, and audio. The content postings can be shared for consumption by others through a social networking system. The content postings can be shared in a variety of formats, such as posts to the social networking system.

The conventional publication of content postings can entail many disadvantages. The disadvantages can be more pronounced as the size of the social networking system and the number of content postings grows. In some instances, a large number of content postings is often published without any apparent relationship among the content postings or any *nexus* to any unifying common theme or event. This lack of apparent relationship can engender confusion or frustration on the part of users or otherwise detract from usability of the social networking system. Similarly, in other instances, a small number of content postings is often published on a particular event. The small number of content postings can detract from the user experience with the social networking system because too little information about the event is provided to the user. Moreover, even when content postings are to be published on a particular event, there are no assurances that the content postings are relevant to the event or are published by reliable entities having authoritative knowledge about the event. Further still, because an event may change over time, static publication of content postings can often render the content postings stale and obsolete.

An improved approach to publication of content postings overcomes the foregoing and other disadvantages associated with conventional approaches. The present disclosure can allow for the collection of a variety of content postings by event (or topic or subject matter). The content postings, or metadata about the content postings, can be organized into a variety of categories and presented by category to a user with an interest in the event. The categories can be associated with, for example, authorities, conversations of eyewitnesses, eyewitness media, and metadata. Other categories are possible. When presented to the user, the categories of content postings can provide multidimensional, comprehensive information about and perspectives on the event. The content postings can be organized and presented in a variety of manners. The organization and presentation of content postings and metadata relating to the content postings can provide to users information regarding the event that is both relevant and timely (e.g., live).

FIG. 1 illustrates an example system 100 including an example trending topic module 102 configured to share content postings, and metadata about the content postings, with a user of a social networking system, according to an embodiment of the present disclosure. The trending topic module 102 can collect a variety of content postings by event. The content postings, and metadata about the content postings, can be organized into a variety of categories and selectively presented by category to a user with an interest in the event. As used herein, a trending topic can include any occurrence, subject matter, theme, or other event that may be of current interest to one or more users. The trending topic can include, for example, news, political events, social phenomena, or any other occurrence that may prompt persons to share content postings that relate to the trending topic.

The trending topic module 102 can include a content collection module 104 and a content provision module 106. In some instances, the example system 100 can also include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the trending topic module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the trending topic module 102 can be implemented, in part or in whole, as software running on one or more computing devices or systems, such as on a user or client computing device. For example, the trending topic module 102 can be implemented as or within an application (e.g., app), a program, or an applet, etc., running on a user computing device or client computing system. In some instances, the trending topic module 102 can, in part or in whole, be implemented within or configured to operate in conjunction with a social networking system (or service), such as the social networking system 930 of FIG. 9. It should be understood that many variations are possible.

In some embodiments, the content collection module 104 can be configured to facilitate collection of content postings of users. The content postings may be any type of content postings made by a user to be shared with one or more other users. The content posting types can include text posts, image posts, video posts, audio posts, or any combination thereof. The content postings can include any variety of posts made to any one or more types of social networking systems, which can commonly be referred to as posts, tweets, pins, or the like.

In some embodiments, the content provision module 106 can be configured to select, categorize, and present content postings to a user. The content provision module 106 can select from the content postings collected by the content collection module 104. For a particular trending topic, the content provision module 106 can identify the content postings that are related to the trending topic. As discussed in more detail herein, the determination of the content postings related to the trending topic can be performed by a variety of techniques.

The content provision module 106 next can organize the content postings into categories. The categories can be associated with, for example, authorities, conversations of eyewitnesses, eyewitness media, and metadata. The category relating to authorities can include content postings by entities that by virtue of their identity are authoritative regarding the event. The category relating to conversations of eyewitnesses can include content postings of persons who are eyewitnesses to the event. The content postings of the eyewitnesses can include content postings that are contemporaneous with the occurrence of the event, such as content postings that are live with respect to the event. The category relating to eyewitness media can include content postings that are created contemporaneously with the occurrence of the event, such as images, video, and audio that are live with respect to the event. The category relating to metadata can include various attributes, statistics, or timelines based on the content postings related to the event.

The content postings can be organized and presented in a variety of manners. Each of the categories of content postings or metadata relating to the content postings can be presented in its own dedicated region on a screen or page presented through a user interface of a computing device. For example, the regions may be organized under one or more tabs that are selectable by a user. In addition, the content postings for each category can be scrolled or sequentially presented to the user. For example, as newer content postings are published for sharing, the newer content postings can supplement or replace older content postings. Metadata about the content postings can be presented in graphical form, such as graph plots, distributions, and timelines. The organization and presentation of content postings and metadata relating to the content postings can provide to a user information regarding the event that is both relevant and timely (e.g., live). The content provision module 106 is described in more detail in connection with FIG. 2.

In some embodiments, the data store 110 can be configured to store and maintain various types of data. In some implementations, the data store 110 can store content postings generated by all users of a social networking system (e.g., the social networking system 930 of FIG. 9). The content collection module 104 can retrieve or filter content postings from the data store 110 from which content postings relating to a particular trending topic are selected. The data store 110 can also maintain other information associated with the social networking system. The information associated with the social networking system can include data about users, social connections, social interactions, locations, geo-fenced areas, maps, places, events, groups, posts, communications, content, account settings, privacy settings, a social graph, and various other types of data. In some implementations, the data store 110 can store information associated with users, such as user identifiers, user information, user specified settings, content produced by users, and various other types of user data. As shown in the example system 100, the trending topic module 102 can be configured to communicate and/or operate with the data store 110.

Figure 2:
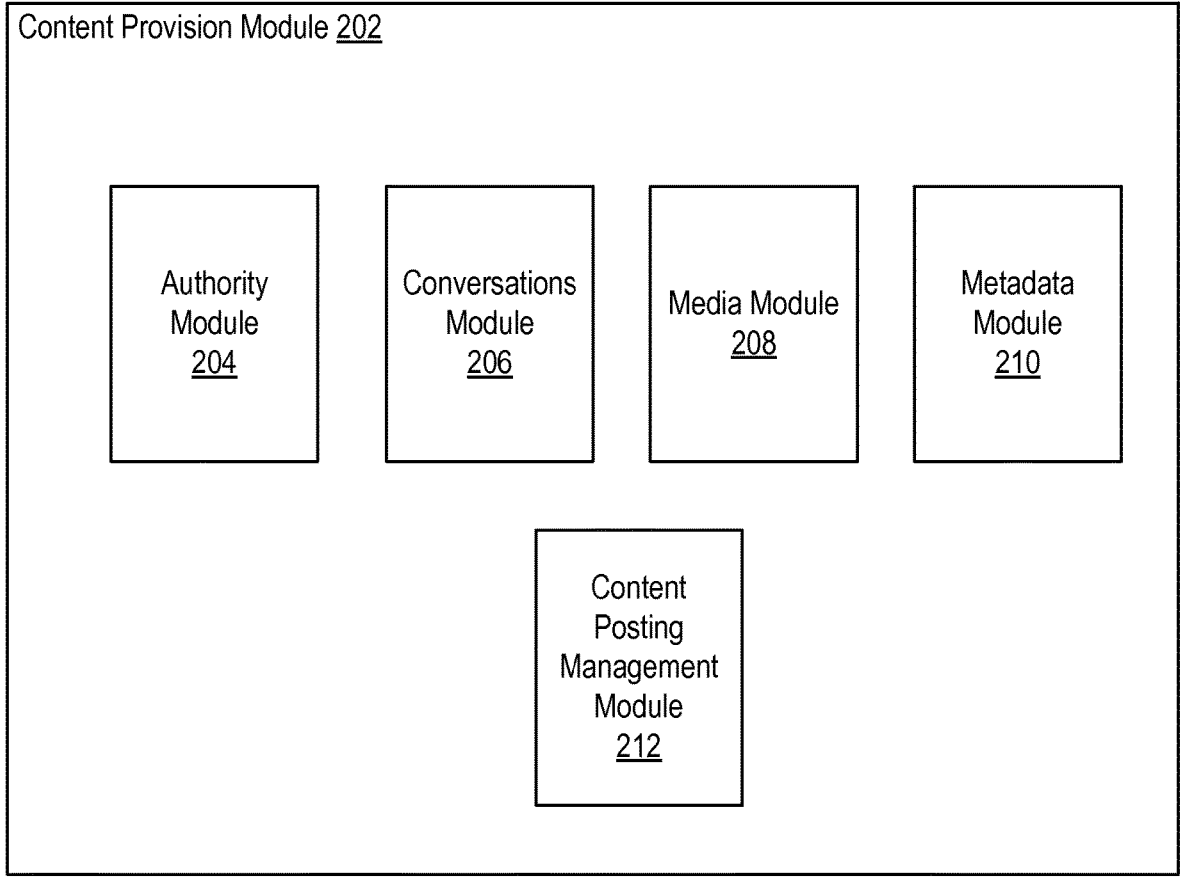
FIG. 2 illustrates an example content provision module configured to facilitate publication of content postings relating to trending topics, according to an embodiment of the present disclosure.

FIG. 2 illustrates an example content provision module 202 configured to facilitate publication of content postings relating to trending topics, according to an embodiment of the present disclosure. In some embodiments, the content provision module 106 of FIG. 1 can be implemented as the example content provision module 202. The content provision module 202 can be configured to select, categorize, and present content postings to a user. As shown in the example of FIG. 2, the content provision module 202 can include an authority module 204, a conversations module 206, a media module 208, a metadata module 210, and a content posting management module 212.

The authority module 204 can be configured to facilitate the selection and presentation of content postings that are generated by authorities or "top voices" on a trending topic. Authorities are those that by virtue of their identity are knowledgeable, expert, or otherwise authoritative about the subject matter of the trending topic. Authorities can include persons (e.g., experts, renown journalists, commentators, celebrities, professionals, politicians, academics, athletes, personal relations of authorities, etc.), organizations (e.g., newspapers, agencies, universities, etc.), or other entities. The authority module 204 can select the content postings of the authorities for presentation to a user. The authority module 204 is discussed in more detail in connection with FIG. 3.

The conversations module 206 can be configured to facilitate the selection and presentation of content postings relating to the trending topic. The conversations module 206 can identify the content postings relating to the trending topic by persons who have a relationship to the trending topic and the content postings can be presented to a user. Such persons can include, for example, eyewitnesses to an event that constitutes the trending topic. The conversations module 206 further can distinguish between such persons who are connections of a particular user versus such persons who are not connections with the particular user. Based on the distinction, the content postings of connections of the user and the content postings of non-connections of the user can be separately presented to the user. The conversations module 206 is discussed in more detail in connection with FIG. 4.

The media module 208 can be configured to select media content items for presentation. Based on identification of entities having a relationship with the trending topic (e.g., eyewitnesses), the media module 208 can identify media content items of such entities. The media content items can include, for example, images, videos, and audio that relate to the trending topic, such as media content items that captured some or all portions of an occurrence of an event relating to the trending topic. The media module 208 can prepare the media content items for presentation to a user. The media module 208 is discussed in more detail in connection with FIG. 5.

The metadata module 210 can be configured to facilitate the collection, analysis, and presentation of metadata about content postings relating to the trending topic. The metadata module 210 can collect metadata about the content postings, such as time of the content postings, the identity or demographic profile of the user who published the content posting, the type of the content posting (e.g., text, image, video, etc.), etc. The metadata module 210 can also use the collected metadata to construct a timeline or history of events relating to the trending topic. The metadata module 210 is discussed in more detail in connection with FIG. 6.

The content posting management module 212 can collect relevant content postings and facilitate their publication. For example, in response to an identification of authorities in relation to the trending topic, the content posting management module 212 can obtain the content postings of the identified authorities that are relevant to the trending topic. As another example, the content posting management module 212 can obtain the content postings of eyewitnesses in relation to the trending topic. As yet another example, the content posting management module 212 can obtain the media content items of eyewitnesses. As yet still another example, the content posting management module 212 can obtain metadata about the content postings. The obtained content postings and metadata relating to the content postings can be prepared for publication to a user. In some embodiments, one or more of content postings and metadata relating to the content postings can be presented to the user in real time (or near real time) to provide live (or near live) content regarding the trending topic.

The content posting management module 212 can selectively present the content postings and related metadata to a user. In some embodiments, each category of content postings or related metadata can be presented in its own dedicated region on a screen of a user interface. For example, the content posting or related metadata of one or more categories can be presented upon selection of a tab on the screen associated with the one or more categories. In one instance, the content postings relating to the categories of authorities, eyewitness media, and metadata can be presented under one tab while the content postings relating to the category of conversations of eyewitnesses can be presented under another tab. In other instances, the categories of content postings and metadata relating to the content postings can be selectively organized and presented in other suitable manners.

The content posting management module 212 can collectively or sequentially present content postings. Items of content postings or related metadata can be presented in a dedicated region of one or more screens of a user interface. The region can display as many content postings as can be accommodated in the region. In some embodiments, when a region lacks accommodation (i.e., space) to present another content posting, the content provision module 202 may remove an old content posting to allow for the presentation of a new content posting. The removal may occur after the old content posting has been presented for a selected time interval. In some embodiments, the process of removing old content postings to allow for the presentation of new content postings can be performed on a first-in-first-out basis. In some embodiments, the selective removal and addition of content postings may be presented as scrolling behavior reflected in the user interface. The content provision module 202 may remove older content postings in favor of newer content postings to preserve the timeliness of the content postings and optimize their impact on users who are interested in accessing the most up-to-date content regarding the trending topic.

Figure 3:
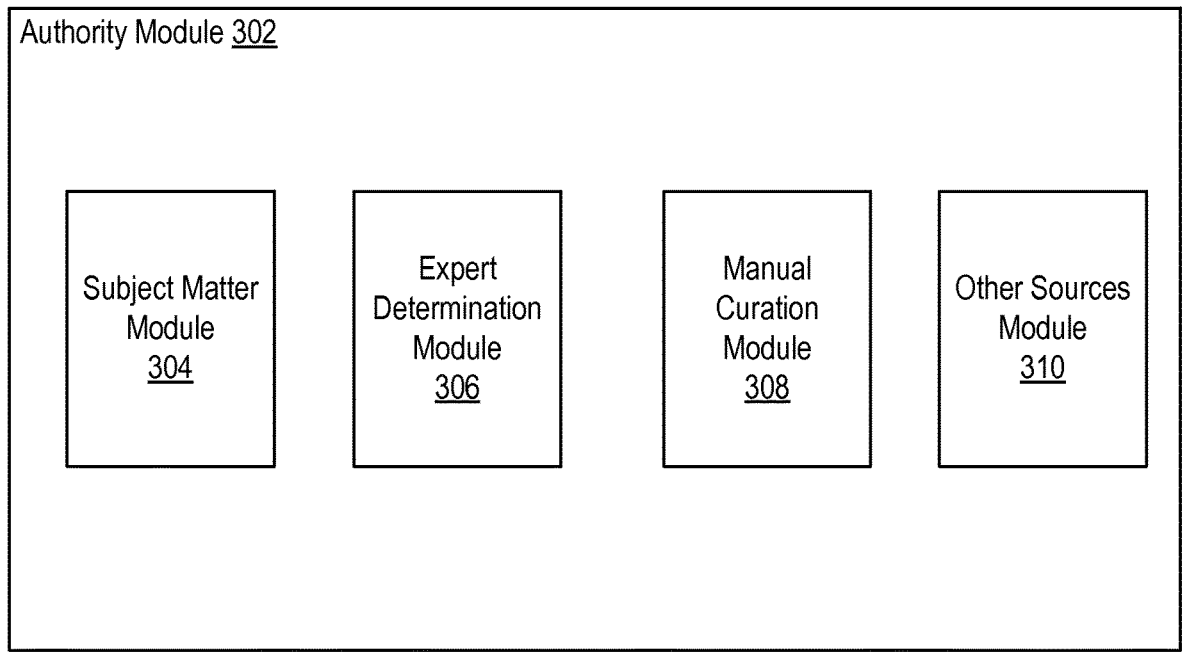
FIG. 3 illustrates an example authority module, according to an embodiment of the present disclosure.

FIG. 3 illustrates an example authority module 302, according to an embodiment of the present disclosure. In some embodiments, the authority module 302 can be configured to facilitate the selection and presentation of content postings that are generated by authorities. In some embodiments, the authority module 204 can be implemented by the authority module 302. The authority module 302 can include a subject matter module 304, an expert determination module 306, a manual curation module 308, and an other sources module 310.

The subject matter module 304 can determine the subject matter of a trending topic. In some embodiments, the subject matter module 304 can parse a textual expression of a trending topic to determine entities who are included as subject matter related to the trending topic. Such entities can be considered authorities in relation to the trending topic. For example, if a trending topic relates to "a speech by President Tikku regarding war waged by General Callahan of CountryX", then the subject matter module 304 can determine that President Tikku and General Callahan are authorities based on their being subject matter of the trending topic.

The expert determination module 306 can identify experts relating to the trending topic. In some embodiments, the social networking system can determine experts on subject matter relating to the trending topic by any one or more of various techniques. For example, a user can be identified as an expert based on her own designation, her activities (e.g., posts, interactions, etc.) with respect to the subject matter, designation of others who view her as an expert, her reputation with respect to the subject matter, or any combination of these or other factors.

The manual curation module 308 can receive an identification of authorities in relation to the trending topic based on manual review. Manual review can involve an administrator of the social networking system or an individual of another organization determining that an entity constitutes an authority in relation to the trending topic. For example, if a trending topic relates to the personal life of a celebrity, then an individual may determine that the spouse or other personal relation of the celebrity is an authority in relation to the trending topic.

The other sources module 310 can determine other types of authorities in relation to the trending topic. The other types of authorities can include certain entities that could constitute authorities that are not necessarily identified by the subject matter module 304, the expert determination module 306, and the manual curation module 308. As an example, the other sources module 310 may determine that certain notable journalists affiliated with certain reputable news organizations can be authorities in relation to a trending topic.

After the identification of authorities, content postings of the authorities that are relevant to the trending topic can be identified. The identified content postings of the authorities then can be presented for a user.

Figure 4:
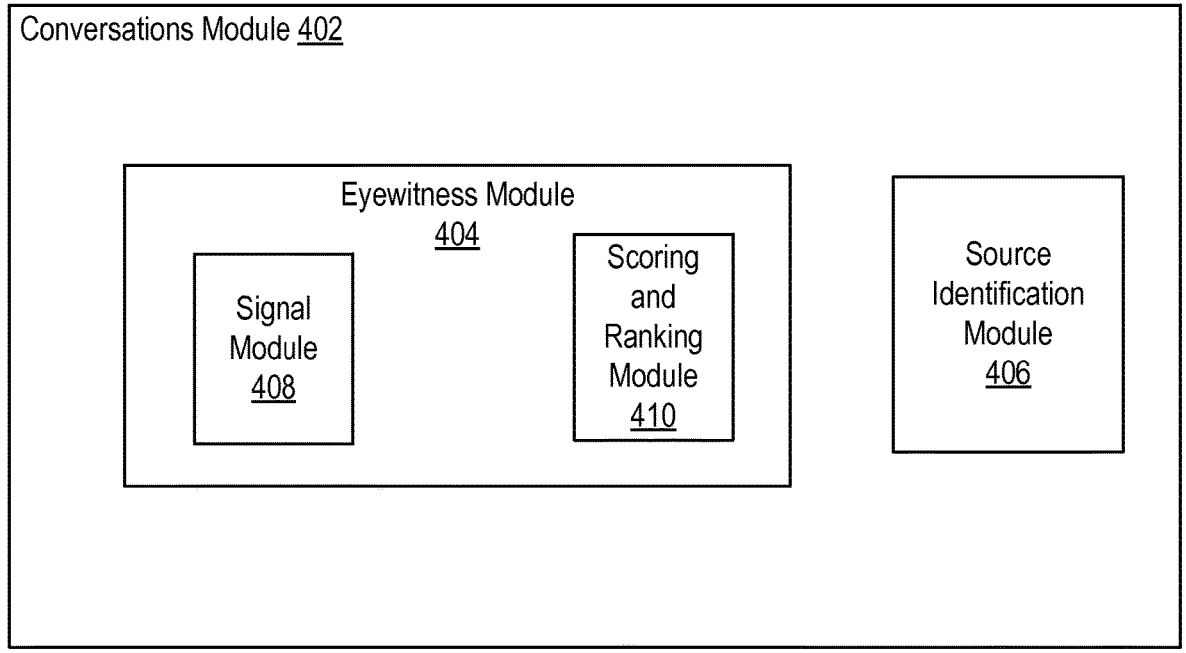
FIG. 4 illustrates an example conversations module, according to an embodiment of the present disclosure.

FIG. 4 illustrates an example conversations module 402, according to an embodiment of the present disclosure. In some embodiments, the conversations module 402 can be configured to facilitate the selection and presentation of content postings from eyewitnesses or others having a direct, live *nexus* with the trending topic. In some embodiments, the conversations module 206 can be implemented by the conversations module 402. The conversations module 402 can include an eyewitness module 404 and a source identification module 406.

The eyewitness module 404 can include a signal module 408 and a scoring and ranking module 410. The signal module 408 can analyze signals (or attributes) with respect to the content postings to determine whether the content postings relate to content from eyewitnesses. The signals can include, for example, location where the content posting was uploaded; time when the content posting was generated or uploaded; whether the content posting was uploaded by a mobile computing device (e.g., a mobile phone) instead of a non-mobile computing device; whether the connection used for uploading the content posting involved a remote connection (e.g., cellular) instead of a local connection (e.g., Wi-Fi); whether image content in the content posting was determined through image analysis to be of a predetermined type (e.g., screenshots or animations suggest the content posting is not from an eyewitness); whether comments associated with the content posting are indicative of eyewitnesses; whether the content posting is from an entity already determined to be an eyewitness; and the reputation of an entity as an eyewitness for the trending topic. Other signals can be used to help determine whether a content posting is associated with eyewitnesses.

The scoring and ranking module 410 can assign a score to a content posting for each signal. The score can reflect the contribution of the signal to a determination that the content posting is from an eyewitness. In some embodiments, the score can be normalized or weighted to suitably reflect the relative importance of the signal in comparison to other signals in the determination of whether the content posting is from an eyewitness. The scoring and ranking module 410 can aggregate (e.g., combined, add, multiply, etc.) all of the scores for the signals associated with a content posting to produce an aggregate score for the content posting. The aggregate score for the content posting can be compared to a threshold value corresponding to a confidence level that the content posting is from an eyewitness. When the aggregate score satisfies the threshold value, the scoring and ranking module 410 can determine that the content posting is from an eyewitness. When the aggregate score does not satisfy the threshold value, the scoring and ranking module 410 can determine that the content posting is not from an eyewitness or that it cannot be known with sufficient confidence whether the content posting is from an eyewitness.

The scoring and ranking module 410 can rank the content postings that have been determined to be from an eyewitness. In some embodiments, one or more of the ranked content postings can be presented to a user according to their rank.

The source identification module 406 can determine whether the identified content postings of eyewitnesses are content postings of connections having a threshold relationship with a user. The source identification module 406 can determine the degree of connection between the user and the entity responsible for uploading the content posting based on social graph data maintained for the social networking system. The threshold relationship may be a first connection (e.g., friend) with the user or a connection other than a first connection. In some instances, the content postings of friends of the user can be separated from or prioritized over the content postings of non-friends. For example, the content postings of friends can be presented above the content postings of non-friends.

Figure 5:
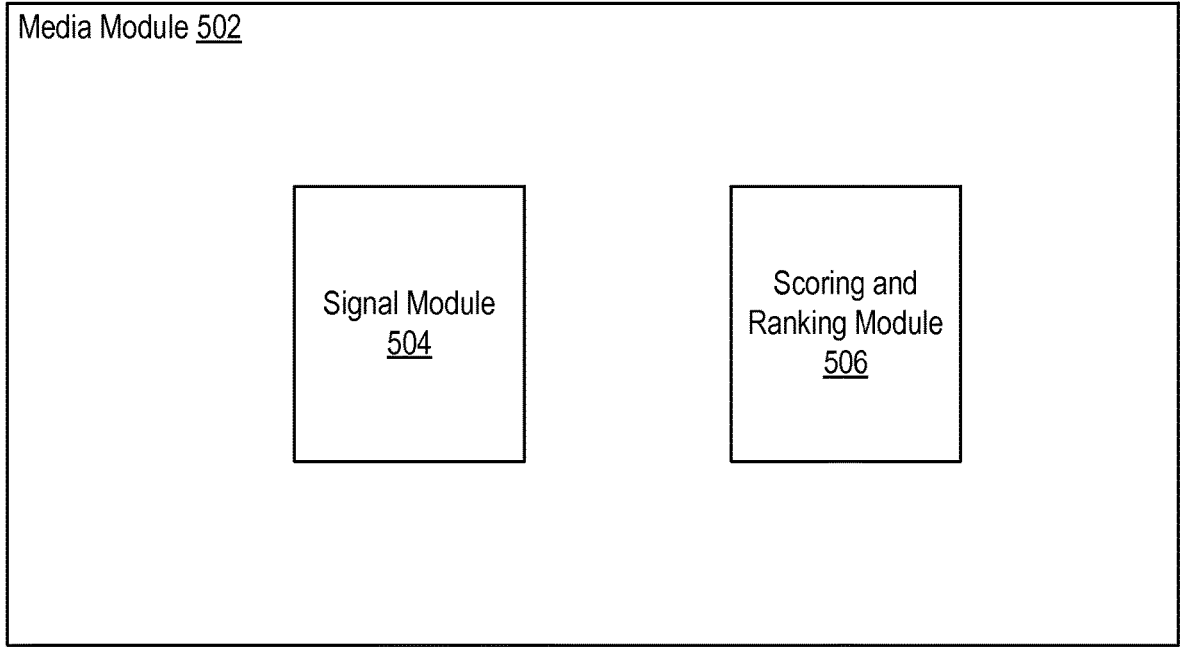
FIG. 5 illustrates an example media module, according to an embodiment of the present disclosure.

FIG. 5 illustrates an example media module 502, according to an embodiment of the present disclosure. In some embodiments, the media module 502 can be configured to facilitate the selection and presentation of media content items of content postings. In some embodiments, the media module 502 in particular may select or prioritize media content items that are generated by eyewitnesses. In some embodiments, the media module 208 can be implemented by the media module 502.

The media module 502 can include a signal module 504 and a scoring and ranking module 506. The signal module 504 can analyze signals (or attributes) with respect to the media content items to determine whether the media content items reflect the live capture of events associated with the trending topic. In some embodiments, the signals can include location of capture of the media content item and the time during which the media content item was captured or uploaded. In some embodiments, additional or alternative signals can be used, such as the signals used by the signal module 408 and the signals used to select content for presentation in a newsfeed for a user of the social networking system.

The scoring and ranking module 506 can assign a score to each signal associated with a media content item. The score can reflect the contribution of the signal to a determination that the media content item is from an eyewitness. In some embodiments, the score can be normalized or weighted to suitably reflect the relative importance of the signal in comparison to other signals in the determination of whether the media content item is from an eyewitness. The scoring and ranking module 506 can aggregate (e.g., combined, add, multiply, etc.) all of the scores for the signals associated with a media content item to produce an aggregate score for the media content item. The aggregate score for the media content item can be compared to a threshold value corresponding to a confidence level that the media content item is from an eyewitness. When the aggregate score satisfies the threshold value, the scoring and ranking module 506 can determine that the media content item is from an eyewitness. When the aggregate score does not satisfy the threshold value, the scoring and ranking module 506 can determine that the media content item is not from an eyewitness or that it cannot be known with sufficient confidence whether the media content item is from an eyewitness.

Figure 6:
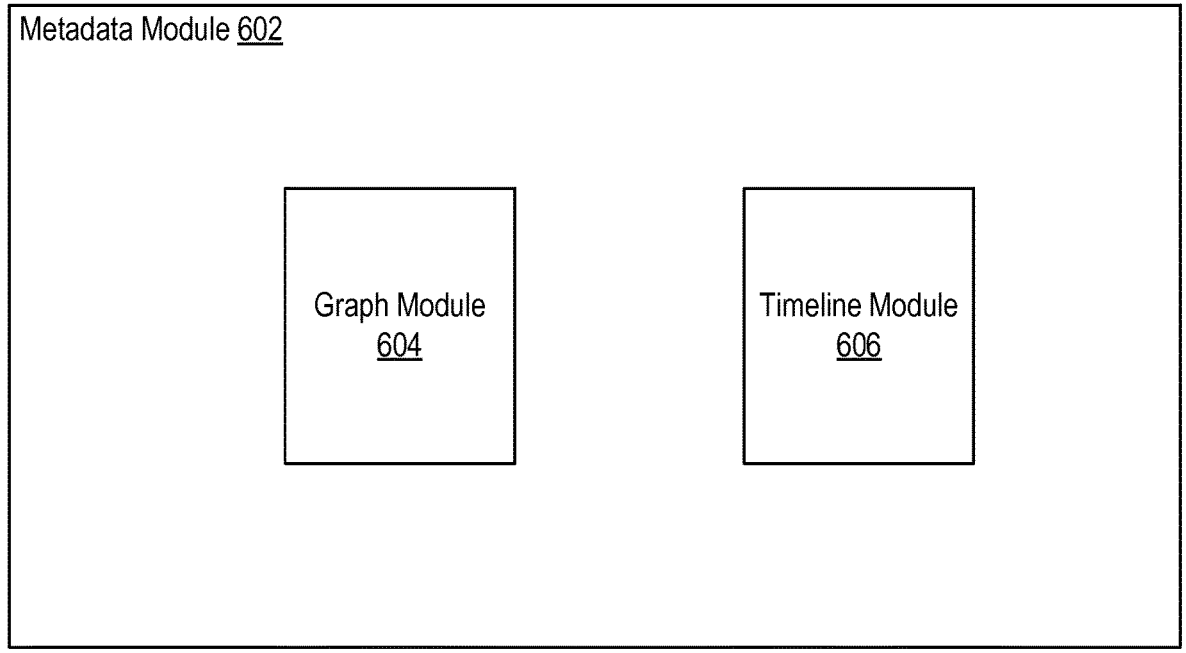
FIG. 6 illustrates an example metadata module, according to an embodiment of the present disclosure.

FIG. 6 illustrates an example metadata module 602, according to an embodiment of the present disclosure. In some embodiments, the metadata module 602 can be configured to facilitate the collection, analysis, and presentation of metadata about content postings relating to the trending topic. In some embodiments, the metadata module 602 in particular may present such metadata in graphical form. In some embodiments, the metadata module 210 can be implemented by the metadata module 602.

The metadata module 602 can include a graph module 604 and a timeline module 606. With respect to a trending topic, the graph module 604 can collect various metadata about the content postings, such as time of the content postings, the identity or demographic profile of the users who published the content postings, the type of the content posting (e.g., text, image, video, etc.), etc. The graph module 604 can use the collected metadata to render presentation of the data in the form of a graph, such as a time based function or distribution.

The timeline module 606 can use the collected metadata to construct a timeline or history relating to the trending topic. In some embodiments, the timeline module 606 can create a timeline of significant events relating to a trending topic. For example, the timeline module 606 can receive a manual identification of events relating to the trending topic by an administrator of the social networking system and render the events in a timeline. As another example, the timeline module 606 can analyze the distribution of timestamps of content postings relating to the trending event. The occurrence of significant events relating to the trending topic may be determined based on peaks in the distribution. Based on the timing of the peaks, the timeline module 606 may parse comments relating to contemporaneous content postings or other sources of information to identify unique words or phrases that describe the significant events. The timeline module 606 may use the identified words and phrases to generate a description for each significant event relating to the trending topic. The timeline module 606 can automatically generate a timeline of significant events relating to the trending topic based on the determined time of the significant events and the generated descriptions of the significant events. Other techniques to generate the timeline are possible.

Figure 7A:
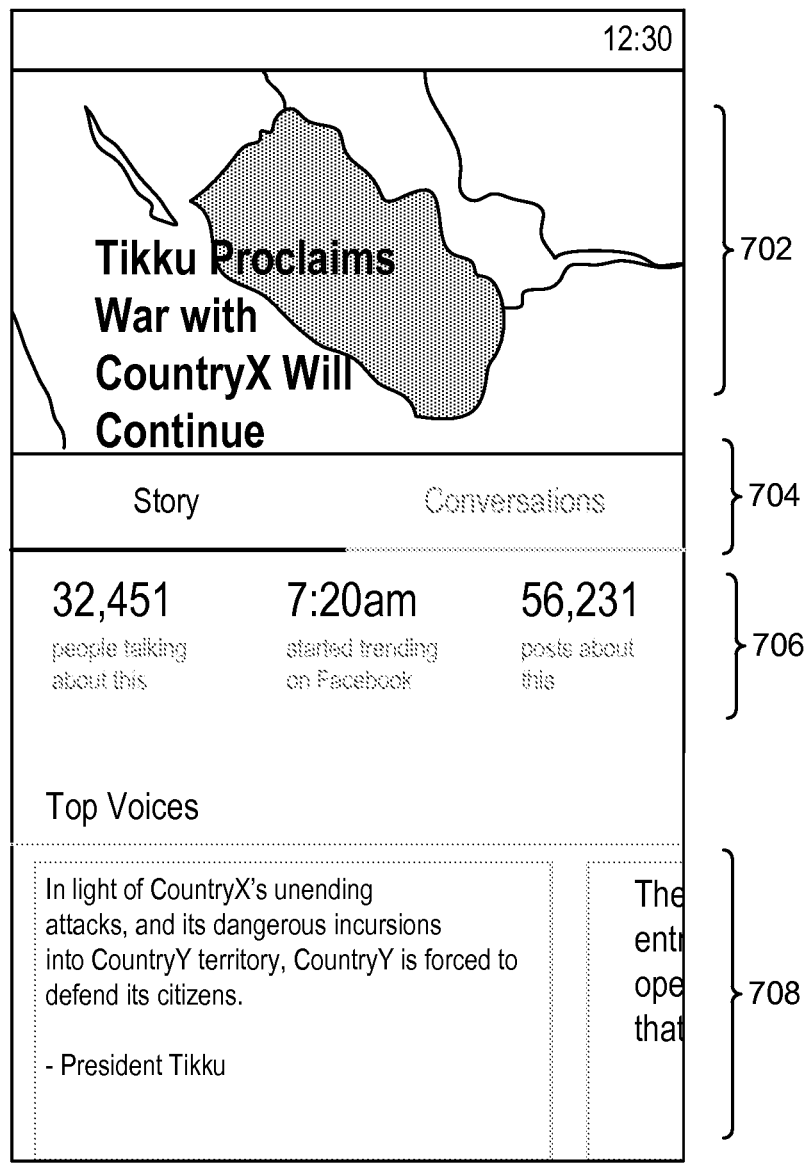
FIGS. 7A-7F illustrate an example user interface associated with presenting content postings relation to authorities, conversations of eyewitnesses, eyewitness media, and metadata, according to an embodiment of the present disclosure.

FIG. 7A illustrates an example user interface 700 associated with presenting content postings in relation to authorities, conversations of eyewitnesses, eyewitness media, and metadata, according to an embodiment of the present disclosure. The user interface 700 can be an example interface for presenting or utilizing various embodiments, components, and/or features of the present disclosure. The user interface 700 can include a first interface portion 702 that provides an indication of the trending topic. The user interface 700 can include a second interface portion 704 that includes tabs under which various categories of content postings can be presented. For example, a first tab ("Story"), when selected, can present to a user content postings relating to authorities, media content items, and metadata. As another example, a second tab ("Conversations"), when selected, can present to the user content postings relating to eyewitnesses. A third interface portion 706 can provide a summary of metadata about the content postings, such as the number of users communicating about the trending topic, when the topic began trending on the social networking system, and the number of content postings that relate to the trending topic. A fourth interface portion 708 can present content postings by authorities relating to the trending topic. The content postings by authorities can be presented in a sequential manner whereby new content postings are periodically added to the fourth interface portion 708.

Figure 7B:

FIG. 7B illustrates the example user interface 700 associated with presenting content postings in relation to authorities, conversations of eyewitnesses, eyewitness media, and metadata, according to an embodiment of the present disclosure. The fourth interface portion 708 can present new content postings by authorities relating to the trending topic as they become available. When the user interface 700 is scrolled, a fifth interface portion 710 can be displayed. The fifth interface portion 710 can present headlines or links to articles regarding the trending topic.

Figure 7C:

FIG. 7C illustrates the example user interface 700 associated with presenting content postings in relation to authorities, conversations of eyewitnesses, eyewitness media, and metadata, according to an embodiment of the present disclosure. A sixth interface portion 712 can present media content items, such as images, video, and audio, captured by eyewitnesses.

Figure 7D:
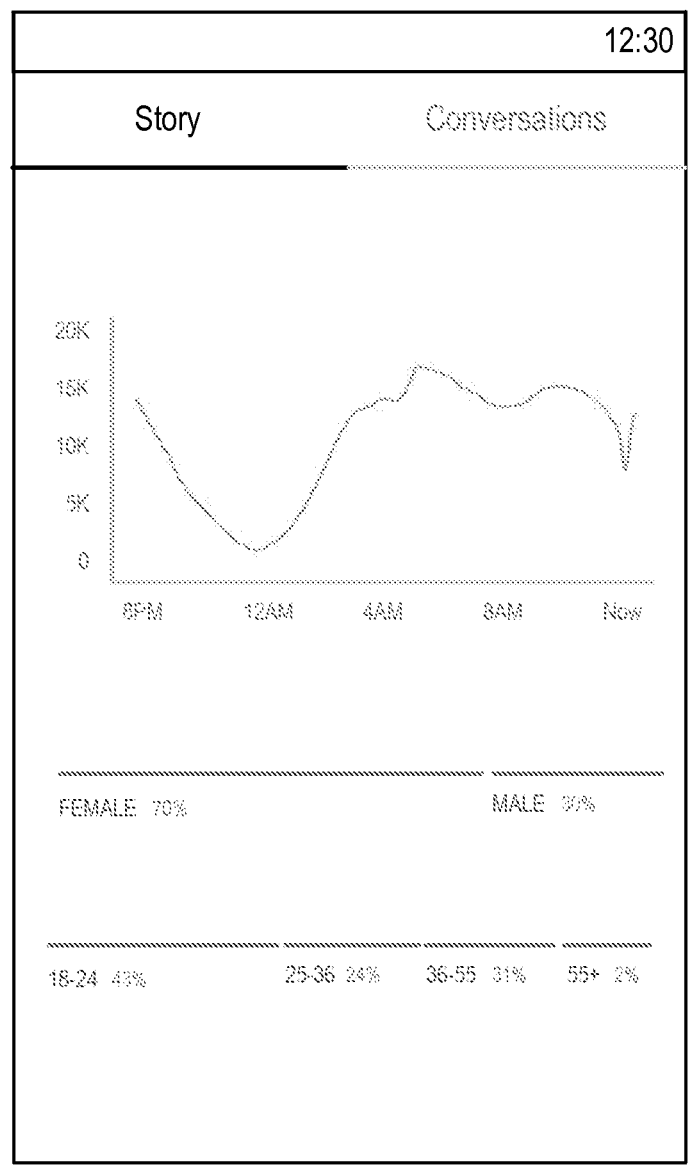

FIG. 7D illustrates the example user interface 700 associated with presenting content postings in relation to authorities, conversations of eyewitnesses, eyewitness media, and metadata, according to an embodiment of the present disclosure. A seventh interface portion 714 can present graphical rendering of metadata relating to the content postings. For example, a graph can be rendered that indicates the number of content postings over a time interval. As another example, a graph can be rendered that indicates the distribution of content postings by the gender or age (or other demographic attribute) of the entities that uploaded the content postings.

Figure 7E:
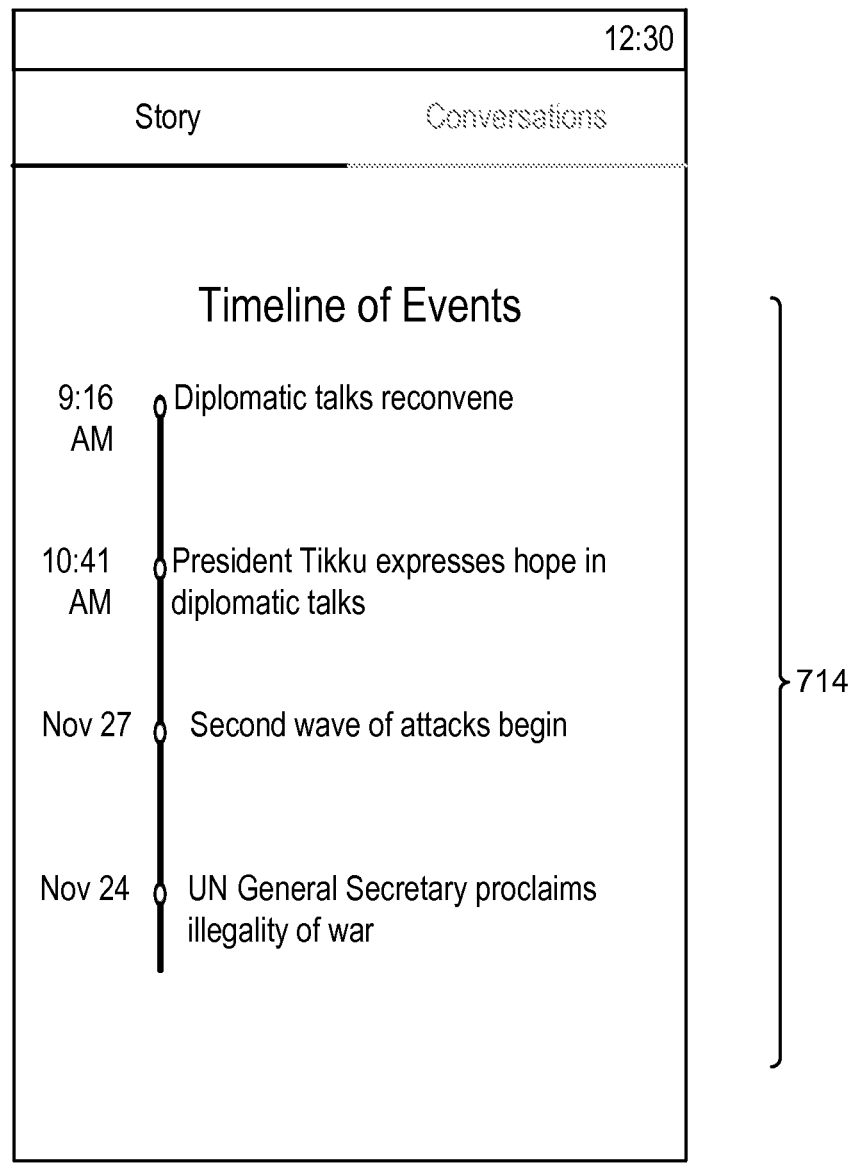

FIG. 7E illustrates the example user interface 700 associated with presenting content postings in relation to authorities, conversations of eyewitnesses, eyewitness media, and metadata, according to an embodiment of the present disclosure. The seventh interface portion 714 also can present a timeline of significant events relating to a trending topic.

Figure 7F:

FIG. 7F illustrates the example user interface 700 associated with presenting content postings relation to authorities, conversations of eyewitnesses, eyewitness media, and metadata, according to an embodiment of the present disclosure. An eighth interface portion 716 can present content postings that represent conversations about the trending topic. The content postings can be posted by eyewitnesses of events surrounding the trending topic. The content postings may be generated, uploaded, and presented in real time (or near real time) to provide a live (or near live) communication environment. The eighth interface portion 716 can present the content postings from friends of a user separately from the content postings of non-friends of the user. For example, the content postings from friends may be displayed above or more prominently than content postings from others.

Figure 8:
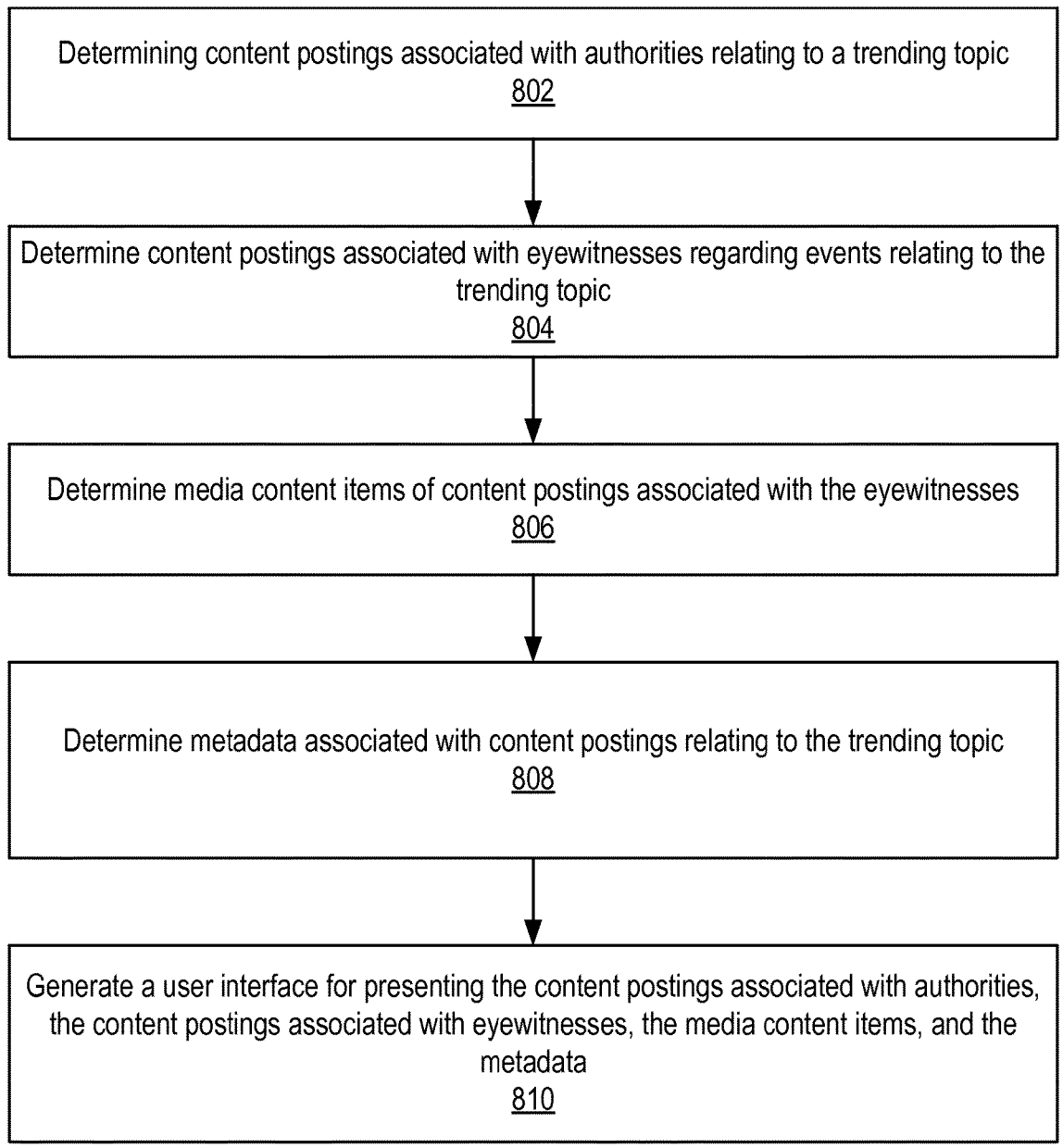
FIG. 8 illustrates an example method associated with presenting content postings, according to an embodiment of the present disclosure.

FIG. 8 illustrates an example method 800 for presenting content postings, according to an embodiment of the present disclosure. It should be appreciated that there can be additional, fewer, or alternative steps performed in similar or alternative orders, or in parallel, within the scope of the various embodiments unless otherwise stated.

At block 802, the method 800 can determine content postings associated with authorities relating to a trending topic. At block 804, the method 800 can determine content postings associated with eyewitnesses regarding events relating to the trending topic. At block 806, the method 800 can determine media content items of content postings associated with the eyewitnesses. At block 808, the method 800 can determine metadata associated with content items relating to the trending topic. At block 810, the method 800 can generate a user interface for presenting the content postings associated with authorities, the content postings associated with eyewitnesses, the media content items, and the metadata. Other suitable techniques are possible.

Social Networking System—Example Implementation

Figure 9:
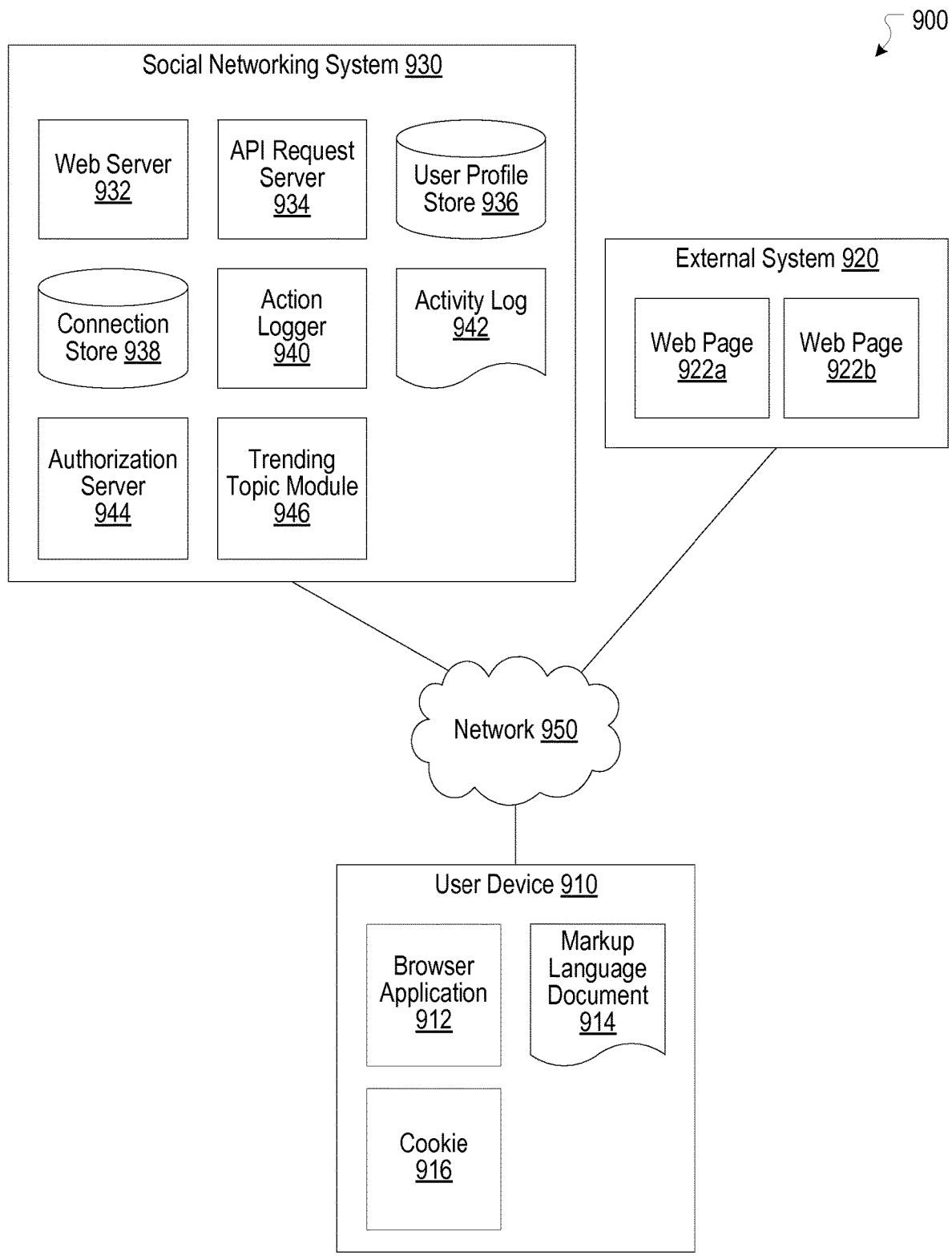
FIG. 9 illustrates a network diagram of an example system that can be utilized in various scenarios, according to an embodiment of the present disclosure.

FIG. 9 illustrates a network diagram of an example system 900 that can be utilized in various scenarios, in accordance with an embodiment of the present disclosure. The system 900 includes one or more user devices 910, one or more external systems 920, a social networking system (or service) 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

In some embodiments, the social networking system 930 can include a trending topic module 946. The trending topic module 946 can be implemented with the trending topic module 102.

Hardware Implementation

Figure 10:
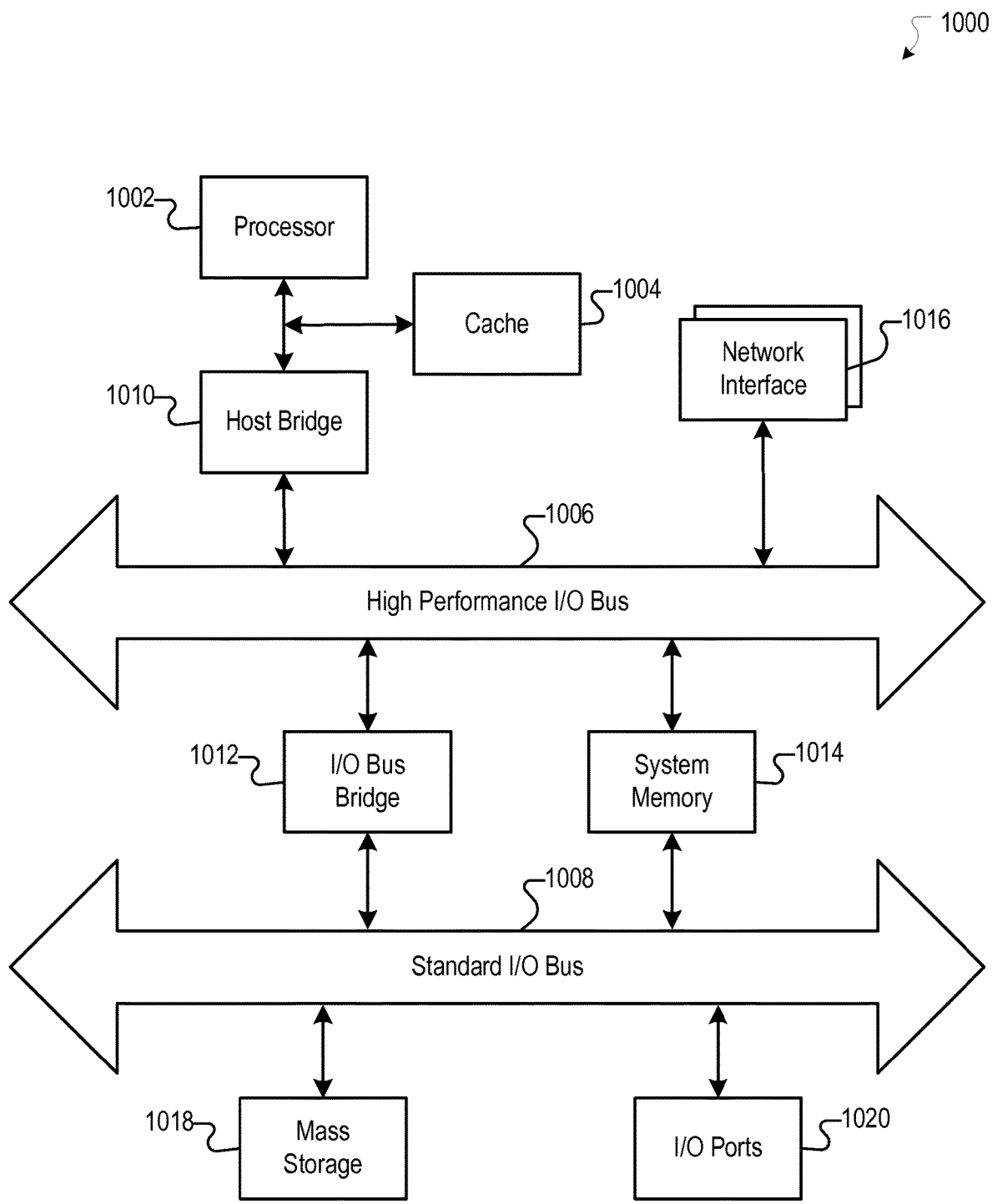
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 930, the user device 910, and the external system 1020, or a component thereof. In an embodiment of the invention, the computer system 1000 may be one server among many that constitutes all or part of the social networking system 930.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a computing system, content postings associated with authorities relating to a trending topic;
    determining, by the computing system, content postings associated with eyewitnesses regarding events relating to the trending topic;
    determining, by the computing system, media content items of content postings associated with the eyewitnesses;
    determining, by the computing system, metadata associated with content postings relating to the trending topic;
    generating, by the computing system, a timeline of significant events relating to the trending topic based on peaks in a distribution of timestamps of content postings and comments contemporaneous with the peaks, wherein descriptions corresponding to each of the significant events are parsed from the content postings or the comments; and
    generating, by the computing system, a user interface for presenting on a page the content postings associated with authorities relating to the trending topic, the content postings associated with eyewitnesses regarding events relating to the trending topic, the media content items of content postings associated with the eyewitnesses, and the metadata associated with the content postings relating to the trending topic.

2. The computer-implemented method of claim 1, wherein the content postings include at least one of text posts, image posts, video posts, and audio posts.

3. The computer-implemented method of claim 1, wherein the authorities include at least one of subject matter reflected in the trending topic, experts associated with the trending topic, entities identified by manual curation, and journalists from news organizations.

4. The computer-implemented method of claim 1, wherein the content postings associated with eyewitnesses are generated and presented in real time or near real time.

5. The computer-implemented method of claim 1, wherein the determining content postings associated with eyewitnesses further comprises:
    obtaining a plurality of signals associated with each content posting; and
    weighting each signal of the plurality of signals based on its relative importance in identifying an eyewitness.

6. The computer-implemented method of claim 5, wherein the determining content postings associated with eyewitnesses further comprises:
    combining the weighted signals to generate an aggregate value for the content posting.

7. The computer-implemented method of claim 6, wherein the determining content postings associated with eyewitnesses further comprises:
    determining whether the aggregate value for the content posting satisfies a threshold value indicating that the content posting is from an eyewitness.

8. The computer-implemented method of claim 1, wherein the determining media content items of content postings associated with the eyewitnesses further comprises:
    analyzing a plurality of signals associated with each media content item.

9. The computer-implemented method of claim 1, wherein the metadata includes at least one of a number of the content postings, time of the content postings, demographic data regarding entities that uploaded the content postings, timing of peaks in the number of the content postings.

10. A system comprising:
at least one processor; and
a memory storing instructions that, when executed by the at least one processor, cause the system to perform:
determining content postings associated with authorities relating to a trending topic;
determining content postings associated with eyewitnesses regarding events relating to the trending topic;
determining media content items of content postings associated with the eyewitnesses;
determining metadata associated with content postings relating to the trending topic;
generating a timeline of significant events relating to the trending topic based on peaks in a distribution of timestamps of content postings and comments contemporaneous with the peaks, wherein descriptions corresponding to each of the significant events are parsed from the content postings or the comments; and
generating a user interface for presenting on a page the content postings associated with authorities relating to the trending topic, the content postings associated with eyewitnesses regarding events relating to the trending topic, the media content items of the content postings associated with the eyewitnesses, and the metadata associated with the content postings relating to the trending topic.

11. The system of claim 10, wherein the content postings include at least one of text posts, image posts, video posts, and audio posts.

12. The system of claim 10, wherein the authorities include at least one of subject matter reflected in the trending topic, experts associated with the trending topic, entities identified by manual curation, and journalists from news organizations.

13. The system of claim 10, wherein the content postings associated with eyewitnesses are generated and presented in real time or near real time.

14. The system of claim 10, wherein the determining content postings associated with eyewitnesses further comprises:
obtaining a plurality of signals associated with each content posting; and
weighting each signal of the plurality of signals based on its relative importance in identifying an eyewitness.

15. A non-transitory computer-readable storage medium including instructions that, when executed by at least one processor of a computing system, cause the computing system to perform:
determining content postings associated with authorities relating to a trending topic;
determining content postings associated with eyewitnesses regarding events relating to the trending topic;
determining media content items of content postings associated with the eyewitnesses;
determining metadata associated with content postings relating to the trending topic;
generating a timeline of significant events relating to the trending topic based on peaks in a distribution of timestamps of content postings and comments contemporaneous with the peaks, wherein descriptions corresponding to each of the significant events are parsed from the content postings or the comments; and
generating a user interface for presenting on a page the content postings associated with authorities relating to a trending topic, the content postings associated with eyewitnesses regarding events relating to the trending topic, the media content items of the content postings associated with the eyewitnesses, and the metadata associated with the content postings relating to the trending topic.

16. The non-transitory computer-readable storage medium of claim 15, wherein the content postings include at least one of text posts, image posts, video posts, and audio posts.

17. The non-transitory computer-readable storage medium of claim 15, wherein the authorities include at least one of subject matter reflected in the trending topic, experts associated with the trending topic, entities identified by manual curation, and journalists from news organizations.

18. The non-transitory computer-readable storage medium of claim 15, wherein the content postings associated with eyewitnesses are generated and presented in real time or near real time.

19. The non-transitory computer-readable storage medium of claim 15, wherein the determining content postings associated with eyewitnesses further comprises:
obtaining a plurality of signals associated with each content posting; and
weighting each signal of the plurality of signals based on its relative importance in identifying an eyewitness.

* * * * *